US007760200B2

(12) United States Patent
Abe

(10) Patent No.: US 7,760,200 B2
(45) Date of Patent: Jul. 20, 2010

(54) IMAGE DATA-OUTPUTTING UNIT AND LIQUID CRYSTAL DISPLAY DEVICE

(75) Inventor: Hirotoshi Abe, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 874 days.

(21) Appl. No.: 11/645,622

(22) Filed: Dec. 27, 2006

(65) Prior Publication Data

US 2008/0001871 A1 Jan. 3, 2008

(30) Foreign Application Priority Data

Jun. 30, 2006 (JP) ............................ 2006-181038

(51) Int. Cl.
*G06F 3/038* (2006.01)
*G09G 5/00* (2006.01)

(52) U.S. Cl. ....................................... 345/204; 345/100

(58) Field of Classification Search ................. 345/204, 345/98, 100, 545
See application file for complete search history.

(56) References Cited

U.S. PATENT DOCUMENTS 6,301,431 B1 * 10/2001 Yamagata et al. ............. 386/96
6,356,314 B1 * 3/2002 Takebe ....................... 348/564
6,977,636 B2 12/2005 Jinda et al.
2007/0165015 A1 * 7/2007 Li et al. ...................... 345/204

FOREIGN PATENT DOCUMENTS

JP 2002-116743 A 4/2002
JP 2002-215111 A 7/2002

* cited by examiner

*Primary Examiner*—Ricardo L Osorio
(74) *Attorney, Agent, or Firm*—Pillsbury Winthrop Shaw Pittman, LLP

(57) ABSTRACT

An LCD drive of an image data-outputting unit causes an LCD to display thereon the same image twice and perform overdrive for a frame period in a first mode, causes the LCD to display thereon an image to be displayed in the first half of the frame period and display thereon a black image in the second half of the frame period in a second mode, and causes the LCD to display thereon the same image twice for the frame period without performing the overdrive in a third mode.

16 Claims, 5 Drawing Sheets

IMAGE DATA-OUTPUTTING UNIT AND LIQUID CRYSTAL DISPLAY DEVICE

The present application is based on Japanese patent application No. 2006-181038, the entire contents of which are incorporated herein by reference.

BACKGROUND

1. Field

One embodiment of the invention relates to an image data-outputting unit and a liquid crystal display device.

2. Description of the Related Art

Since a liquid crystal panel is of "a hold type" in which an image continues to be displayed at the same level for a one frame period (16 msec), a moving image blur occurs due to a response delay of liquid crystal in the liquid crystal panel of the hold type. On the other hand, since a CRT display, a surface-conduction electron-emitter display (SED) or the like is of "an impulse type" in which the light emission is made only for a moment of one frame period, no moving image blur occurs.

In recent years, the various kinds of methods have been proposed for the purpose of improving the moving image blur occurring in the liquid crystal panel. The techniques relating to these methods, for example, are disclosed in the Japanese Patent Kokai Nos. 2002-116743 and 2002-215111.

A liquid crystal display device disclosed in the Japanese Patent Kokai No. 2002-116743 is such that an image signal is written to a frame memory once for one vertical synchronous time period, an image signal is repeatedly read out from the frame memory twice for one vertical synchronous time period, and a voltage value corresponding the image signal thus read out is applied to each of corresponding display pixels of a liquid crystal panel. As a result, step responsibility of the display pixels is further improved in this case than in the case where the voltage value corresponding to the image signal is repeatedly applied three times at a rate of one time for one vertical synchronous period.

A liquid crystal display device disclosed in the Japanese Patent Kokai No. 2002-215111 includes a frame memory for storing therein an input image signal for one frame, a frame frequency-converting portion for converting a period of an image signal into half a frame period, and outputting the resulting image signal, and a signal switching portion for switching the image signal obtained through conversion of the frame period and a black display signal over to each other. Thus, an image to be displayed is displayed in the first half of the frame period, and a black signal is displayed in the second half of the frame period. As a result, it becomes possible to realize the display of a pseudo impulse type, and thus it is possible to improve degradation of an image quality due to the moving image blur.

However, according to the liquid crystal display device disclosed in the Japanese Patent Kokai No. 2002-116743, although the responsibility of the liquid crystal is improved, the moving image blur cannot be sufficiently improved. In addition, according to the liquid crystal display device disclosed in the Japanese Patent Kokai No. 2002-215111, although the moving image blur can be improved, the overall screen becomes dark because of reduction of a luminance. The displayed image is degraded depending on the kinds of images all the more because there are various displayed images such as the image having a low luminance and the image having a small motion.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION OF PREFERRED EMBODIMENTS

Figure 1:
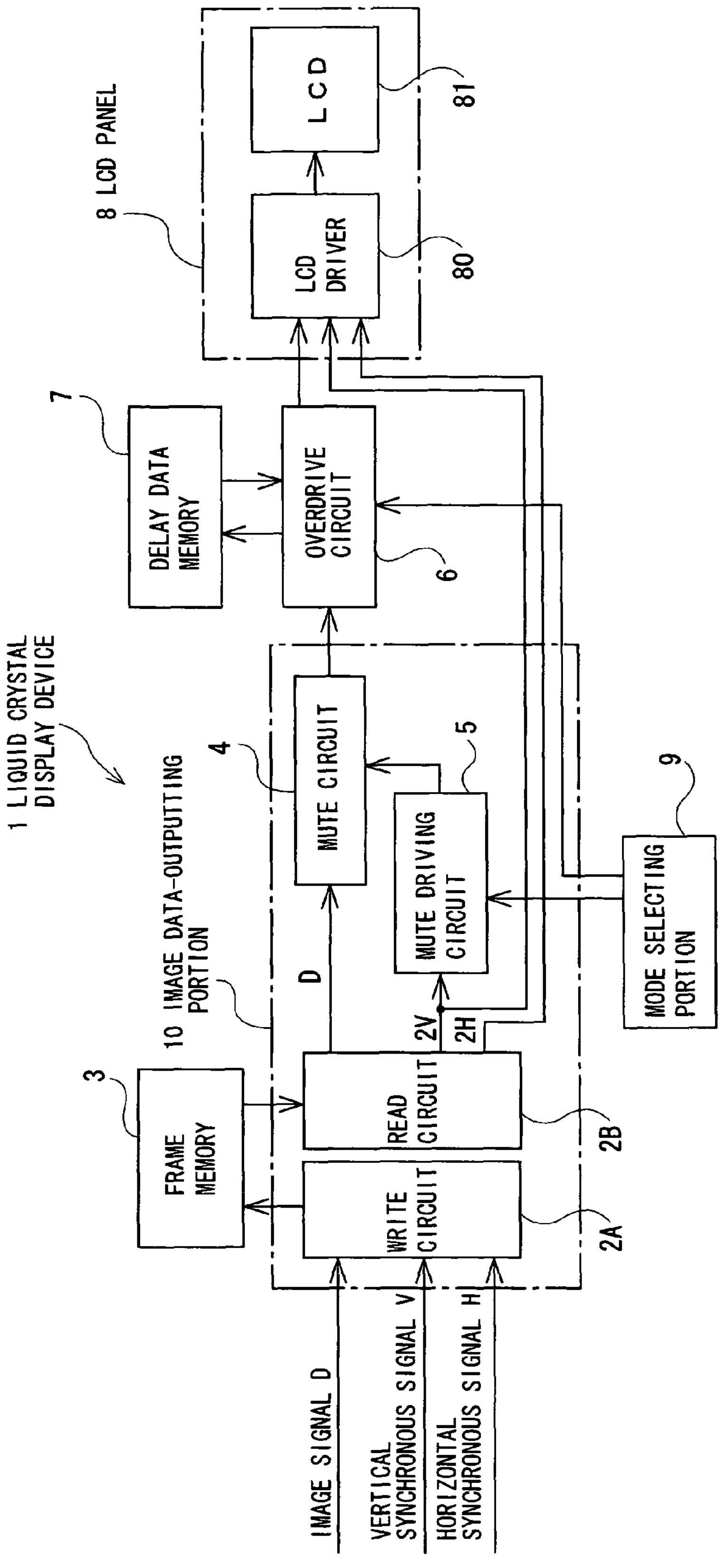
FIG. 1 is an exemplary block diagram showing a configuration of a liquid crystal display device according to a first embodiment of the invention.

Various embodiments according to the invention will be described hereinafter with reference to the accompanying drawings. In general, according to one embodiment of the invention, there is provided an image data-outputting unit, including: a storage portion for storing therein image data supplied in a predetermined period; and an image data-outputting portion for outputting the image data (n−k) times (n and k: integral numbers (n>k≧0)) from the storage portion with an output period which is 1/n of the predetermined period.

In addition, according to a further embodiment of the invention, there is provided an image data-outputting circuit, including: a storage portion for storing therein image data supplied in a predetermined period; an image data-outputting portion for performing a first mode in which the image data is outputted n times from the storage portion in an output period which is 1/n of the predetermined period, or a second mode in which the image data is outputted (n−k) times (n and k: integral numbers (n>k≧0)) from the storage portion in an output period which is 1/n of the predetermined period; an overdrive circuit for, when the first mode is performed, increasing or decreasing a data value of the current image data in accordance with the last image data for a precedent predetermined period and the current image data outputted from the image data-outputting portion, and outputting image data of the increased or decreased data value; and a selecting portion for selecting one of the first and second modes to provide a first or second mode signal to the image data-outputting portion and the over drive circuit.

In addition, according to a still further embodiment of the invention, there is provided a liquid crystal display device, including: a storage portion for storing therein image data supplied in a predetermined period; an image data-outputting portion for performing a first mode in which the image data is outputted n times from the storage portion in an output period which is 1/n of the predetermined period, or a second mode in which the image data is outputted (n−k) times (n and k: integral numbers ($n>k\geqq 0$)) from the storage portion in the period which is 1/n times as large as the predetermined period; an overdrive circuit for, when the first mode is performed, increasing or decreasing a data value of the current image data in accordance with the last image data for a precedent predetermined period and the current image data outputted from the image data-outputting portion, and outputting image data of the increased or decreased data value; a selecting portion for selecting one of the first and second modes to provide a first or second mode signal to the image data-outputting portion and the overdrive circuit; and a liquid crystal panel for displaying thereon an image corresponding to the image data outputted from the image data-outputting portion or the overdrive circuit in accordance with the first or second mode.

According to the invention, the image quality can be enhanced in correspondence to a kind of image such as a moving image or a still image with the simple configuration.

First Embodiment

FIG. 1 is a bock diagram showing a configuration of a liquid crystal display device according to a first embodiment of the invention.

The liquid crystal display device 1 includes a write circuit 2A for writing image data to a frame memory 3 which will be described below for one frame period, a read circuit 2B for reading out the same image data twice from the frame memory 3 for one frame period, the frame memory 3 for storing therein image data, a MUTE circuit (mute means) 4 for outputting one of the two pieces of the same image data in one frame outputted from the read circuit 2B, and inhibits the other piece of the same image data from being outputted, a MUTE driving circuit 5 for driving the MUTE circuit 4, an overdrive circuit 6 for outputting data for which overdrive processing is executed, a delay data memory 7 for storing therein delay data for the overdrive circuit 6, a liquid crystal display (LCD) panel 8 for displaying an image by using an LCD, and a mode selecting portion 9 for selecting a mode among a predetermined number of modes.

Here, the write circuit 2A, the read circuit 2B, the frame memory 3, the MUTE circuit 4, the MUTE driving circuit 5, the overdrive circuit 6, the delay data memory 7 and the mode selecting portion 9 constitute an image data-outputting unit. In addition, the write circuit 2A, the read circuit 2B, the MUTE circuit 4, and the MUTE driving circuit 5 constitute an image data-outputting portion 10.

The write circuit 2A writes a digital image signal (image data) for individual pixels which is successively supplied from a video apparatus or the like with a frame period (e.g., corresponding to 50 Hz) to the frame memory 3, receives as its inputs a vertical synchronous signal V and a horizontal synchronous signal H, and generates a vertical synchronous signal 2V and a horizontal synchronous signal 2H which are two times in frequency as high as the vertical synchronous signal V and the horizontal synchronous signal H, respectively. The read circuit 2B is structured such that it reads out the image data once every output of the vertical synchronous signal 2V from the frame memory 3, that is, reads out the same image data twice in a period (e.g., corresponding to 100 Hz) which is half the frame period.

The MUTE driving circuit 5 drives the MUTE circuit 4 in accordance with the vertical synchronous signal 2V received as its input from the read circuit 2B.

The overdrive circuit 6 executes overdrive processing so that it compares the current image data and the last image data with each other, outputs a data value larger than that of the current image data with respect to the pixels in each of which the data value of the current image data is larger than that of the last image data, outputs a data value smaller than that of the current image data with respect to the pixels in each of which the data value of the current image data is smaller than that of the last image data, and outputs a data value of the current image data with respect to the pixels in each of which the data value of the current image data is equal to that of the last image data. Here, when the mode selecting portion 9 which will be described later selects a third mode in which the same image is displayed twice for one frame period, and no overdrive processing is executed, the current image data is outputted as it is.

The LCD panel 8 includes a liquid crystal display (LCD) 81, and an LCD driver 80 for driving the LCD 81. Note that, both the overdrive circuit 6 and the delay data memory 7 may be incorporated in the LCD panel 8.

LCD 81 is constructed such that a liquid crystal such as a nematic liquid signal is disposed between a full-face electrode and a plurality of pixel electrodes, the resulting construction is sandwiched between a pair of deflection plates, a plurality of active elements such as TFTs are connected to intersections between a plurality of data lines and a plurality of scanning lines which intersect perpendicularly each other, respectively, and the active elements drive the pixels in an active matrix manner, respectively. In addition, the LCD 81 includes a back light, constituted by a cold cathode tube or an LED for radiating a light thereto from its back face side.

The LCD driver 80 drives the LCD 81 such that it selects successively a plurality of scanning lines, and applies a voltage corresponding to the image data to each of a plurality of data lines in accordance with the image data outputted from the overdrive circuit 6 to change a light transmittance of the liquid crystal to suitable one.

The mode selecting portion 9 selects any one among a first mode in which the same image is displayed twice for one frame period and the overdrive processing is executed, a second mode in which the image is displayed in the first half of one frame period and no image is displayed in the second half of one frame period (the black image is inserted), and a third mode in which the same image is displayed twice for one frame period and no overdrive processing is executed in accordance with a manipulation made by a user.

Figure 2:
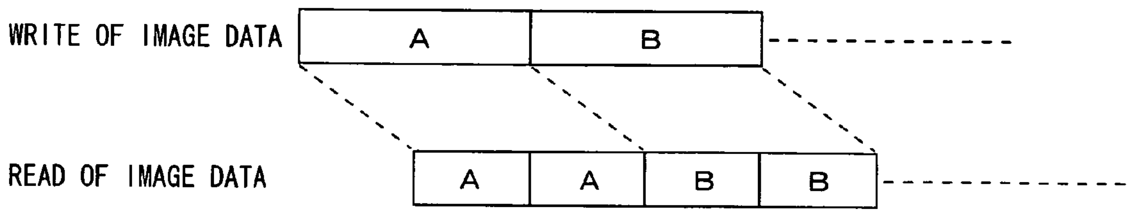
FIG. 2 is an exemplary schematic timing chart showing write and read of image data to and from a frame memory shown in FIG. 1.

FIG. 2 is a schematic diagram showing timings at which the write circuit 2A writes the image data to the frame memory 3, and the read circuit 2B reads out the image data from the frame memory 3. The frame memory 3 has first and second storage areas for storing therein the image data for two frames. As shown in FIG. 2, the image data A is written to the first storage area with the frame period (e.g., corresponding to 50 Hz), the image data A is read out from the frame memory 3 with the frame period (e.g., corresponding to 100 Hz) which is half the write period, the image data A is read out second time from the first storage area of the frame memory 3 and at the same time the image data B is written to the second storage area of the frame memory 3, and the image data B is read out from the second storage area of the frame memory 3 in a period (e.g., corresponding to 100 Hz) which is half the write period. The operation described above is performed for other image data as well.

Figure 3A:
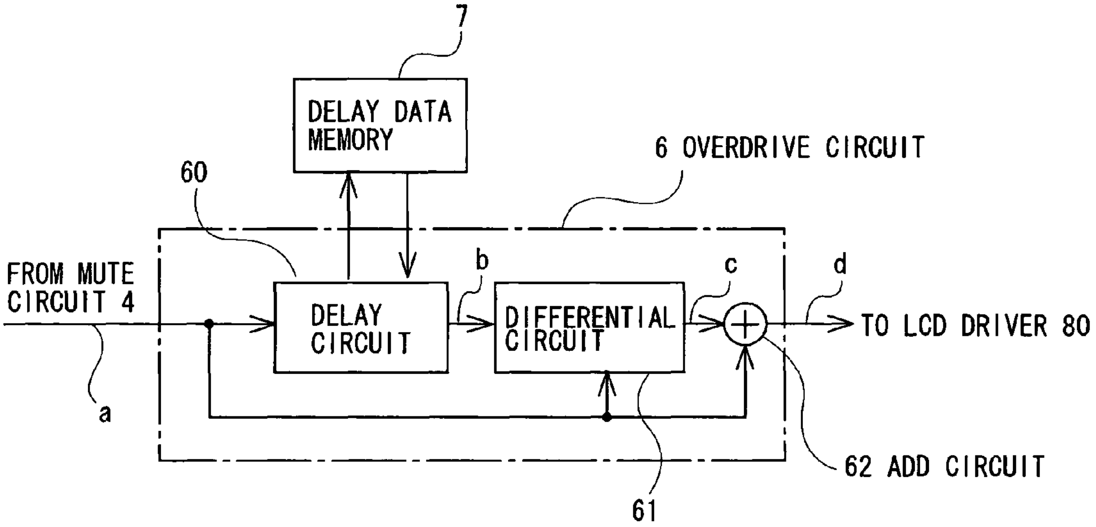
FIG. 3A is an exemplary block diagram showing an overdrive circuit shown in FIG. 1 of the liquid crystal display device according to the first embodiment of the invention.
Figure 3B:
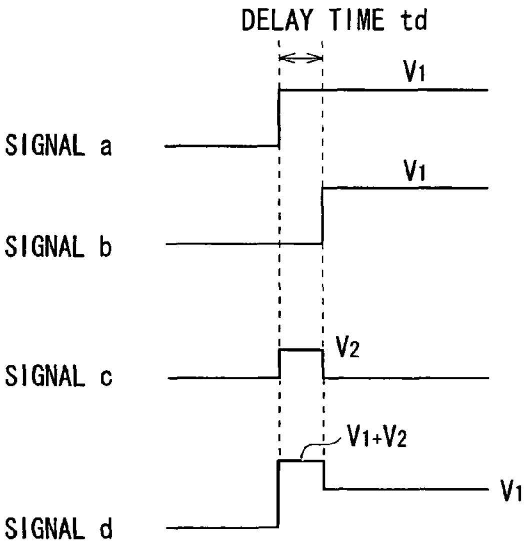
FIG. 3B is an exemplary graphical representation showing an operation of the overdrive circuit shown in FIG. 1.

FIG. 3A is a block diagram showing a structure of the overdrive circuit 6, and FIG. 3B is a signal waveform chart showing an operation of the overdrive circuit 6. The overdrive circuit 6 includes a delay circuit 60, a differential circuit 61, and an add circuit 62. It should be noted that FIG. 3A shows merely an example of the overdrive circuit 6, and thus the overdrive circuit 6 is not limited in structure to FIG. 3A.

The delay circuit 60, as shown in FIG. 3B, receives as its input a signal a having a voltage V1, gives the signal a a delay time $t_d$ corresponding to data stored in the delay data memory 7, and outputs a signal b having the voltage V1. The differential circuit 61 obtains a difference between the signals a and b, and outputs a signal c having a voltage V2 into which the difference is converted at a predetermined magnification. The add circuit 62 adds the signal a and the signal c outputted from the differential circuit 61 to each other and outputs a signal d having an overvoltage (V1+V2).

[Operation of Liquid Crystal Display Device]

Next, an operation of the liquid crystal display device 1 will now be described with reference to FIGS. 4A to 4E.

FIGS. 4A to 4E are respectively graphical representations each showing a waveform of a voltage applied to one pixel constituting the LCD 81, and a light transmittance of the liquid crystal. In each of these figures, a solid line indicates the voltage waveform, and a dashed line indicates the light transmittance of the liquid crystal. In addition, reference symbols (A) and (B) designates the respective pieces of image data.

Figure 4A:
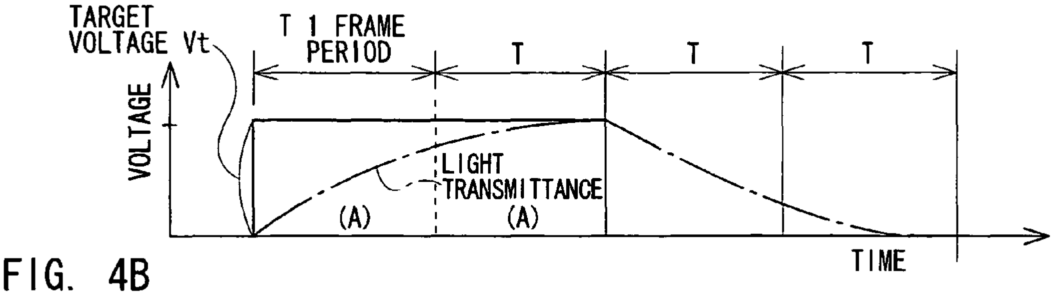
FIGS. 4A to 4E are respectively exemplary graphical representations each showing a waveform of a voltage applied to one pixel constituting a liquid crystal display (LCD) of the liquid crystal display device according to the first embodiment of the invention, and a light transmittance of a liquid crystal in the LCD.
Figure 4B:
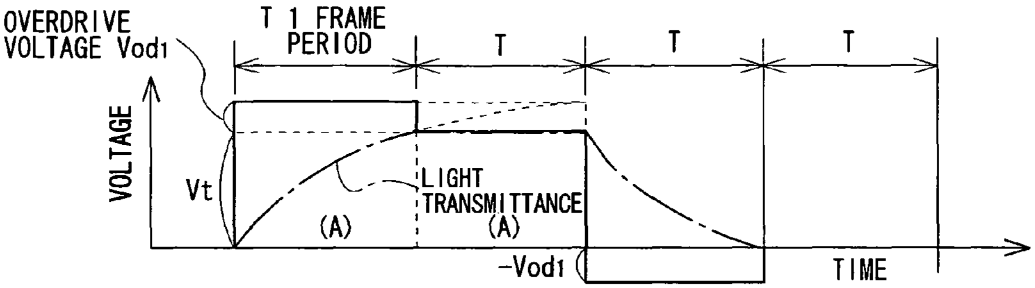

FIGS. 4A and 4B show conventional modes, respectively. That is to say, FIG. 4A shows one, of the conventional modes, in which the same image is displayed for two frame periods (2T). When a target voltage $V_t$ is applied to the liquid crystal for the two frame periods (2T), the light transmittance of the liquid crystal gradually increases, and reaches a predetermined value in the second half of the second frame period T. Also, the light transmittance of the liquid crystal gradually decreases for the next two frame periods (2T).

FIG. 4B shows the other one, of the conventional modes, in which the overdrive processing is executed for the mode shown in FIG. 4A. When a voltage obtained by adding an overdrive voltage $V_{odt1}$ to the target voltage $V_t$ is applied to the liquid crystal for the first frame period T shown in FIG. 4A, the light transmittance of the liquid crystal reaches the target value at the end of the first frame period T.

Figure 4C:
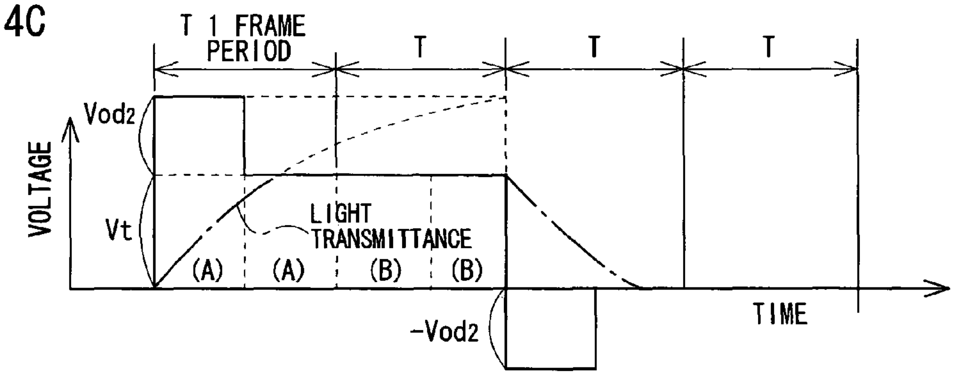
Figure 4D:
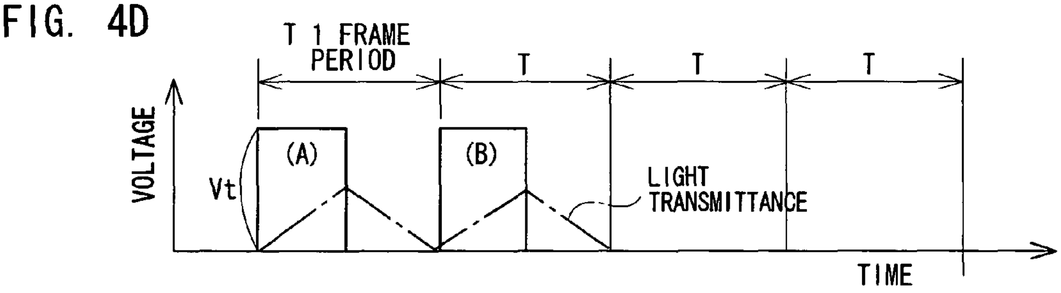
Figure 4E:
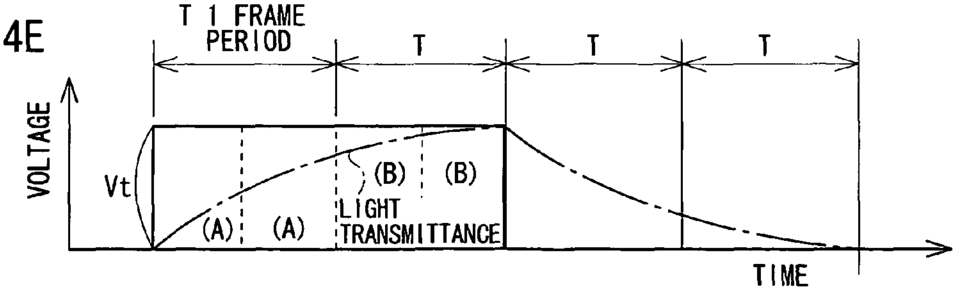

FIG. 4C shows the first mode of this embodiment, FIG. 4D shows the second mode of this embodiment, and FIG. 4E shows the third mode of this embodiment.

(1) First Mode: A description will now be described with respect to the case where the user selects the first mode by the manipulating the mode selecting portion 9. The write circuit 2A writes the image signal D which is successively supplied from the video apparatus or the like with the frame period (e.g., corresponding to 50 Hz) to the frame memory 3, and the read circuit 2B reads out the image signal D from the frame memory 3 with the frame period (e.g., corresponding to 100 Hz) which is half the frame period (e.g., corresponding to 50 Hz) and outputs the image signal D thus read out to the MUTE circuit 4. In addition, the read circuit 2B generates the vertical synchronous signal 2V and the horizontal synchronous signal 2H which are 2 times in frequency as high as the vertical synchronous signal V and the horizontal synchronous signal H, respectively, which are inputted from the video apparatus or the like to the liquid crystal display device 1, and outputs the resulting vertical synchronous signal 2V and horizontal synchronous signal 2H to the LCD driver 80.

The MUTE circuit 4 outputs the image data D outputted from the read circuit 2B to the overdrive circuit 6 as it is by driving the MUTE driving circuit 5 in accordance with the mode selection made by the mode selecting portion 9.

The overdrive circuit 6 compares the current image data and the last image data with each other, and outputs the data value higher than that of the current image data to the LCD driver 80 with respect to the pixels in each of which the data value of the current image data is higher than that of the last image data.

As shown in FIG. 4C, the LCD driver 80 executes the overdrive processing in which the LCD driver 80 drives the LCD 81 so that the LCD 81 displays thereon the same image twice for one frame period T, and applies the voltage to which an overdrive voltage $V_{od2}$ is added to the liquid crystal in the first half of the frame period T. As a result, the light transmittance of the liquid crystal can reach the target value for a time period shorter than that shown in FIG. 4B.

The overdrive voltage $V_{od2}$ is determined in accordance with the signal a shown in FIG. 3B. In addition, the overdrive voltage $V_{od2}$ is previously registered in the form of a combination with the delay time $t_d$ in the delay data memory 7.

(2) Second Mode: A description will now be described with respect to the case where the user selects the second mode by the manipulating the mode selecting portion 9. The write circuit 2A writes the image signal D which is successively supplied from the video apparatus or the like with the frame period (e.g., corresponding to 50 Hz) to the frame memory 3, and the read circuit 2B reads out the image signal D from the frame memory 3 with the frame period (e.g., corresponding to 100 Hz) which is half the frame period (e.g., corresponding to 50 Hz) and outputs the image signal D thus read out to the MUTE circuit 4. In addition, the read circuit 2B generates the vertical synchronous signal 2V and the horizontal synchronous signal 2H which are 2 times in frequency as high as the vertical synchronous signal V and the horizontal synchronous signal H, respectively, which are inputted from the video apparatus or the like to the liquid crystal display device 1, and outputs the resulting vertical synchronous signal 2V and horizontal synchronous signal 2H to the LCD driver 80.

The MUTE circuit 4 outputs the image data D outputted from the read circuit 2B to the overdrive circuit 6 in the first half of the frame period by driving the MUTE driving circuit 5 in accordance with the mode selection made by the mode selecting portion 9, and inhibits the image data from being outputted to the overdrive circuit 6 in the second half of the frame period.

The overdrive circuit 6 outputs the image data outputted from the MUTE circuit 4 to the LCD panel 8 without executing the overdrive processing for the image data outputted from the MUTE circuit 4.

As shown in FIG. 4D, the LCD driver 80 drives the LCD 81 so that the target voltage $V_t$ is applied to the liquid crystal of the LCD 81 in the first half of the frame period T, and the black image is displayed without applying the voltage to the liquid crystal of the LCD 81 in the second half of the frame period T. As a result, although the light transmittance of the liquid crystal is limited to about half the target value and thus the screen becomes dark, the moving image blur can be improved.

Note that, the LCD driver 80 may turn ON the back light in the first half of the frame period T in which the image to be displayed is displayed, and may turn OFF the back light in the second half of the frame period T in which the black image is displayed. As a result, the moving image blur can be further improved.

(3) Third Mode: A description will now be described with respect to the case where the user selects the third mode by the manipulating the mode selecting portion 9. The write circuit 2A writes the image signal D which is successively supplied from the video apparatus or the like with the frame period (e.g., corresponding to 50 Hz) to the frame memory 3, and the read circuit 2B reads out the image signal D from the frame memory 3 with the frame period (e.g., corresponding to 100 Hz) which is half the frame period (e.g., corresponding to 50 Hz) and outputs the image signal D thus read out to the MUTE circuit 4. In addition, the read circuit 2B generates the vertical synchronous signal 2V and the horizontal synchronous signal 2H which are 2 times in frequency as high as the vertical synchronous signal V and the horizontal synchronous signal H, respectively, which are inputted from the video apparatus or the like to the liquid crystal display device 1, and outputs the resulting vertical synchronous signal 2V and horizontal synchronous signal 2H to the LCD driver 80.

The MUTE circuit 4 outputs the image data D outputted from the read circuit 2B to the overdrive circuit 6 as it is by driving the MUTE driving circuit 5 in accordance with the mode selection made by the mode selecting portion 9.

The overdrive circuit 6 outputs the image data outputted from the read circuit 2B to the liquid crystal panel 8 as it is without executing the overdrive processing for the image data outputted from the read circuit 2B.

As shown in FIG. 4E, the LCD driver 80 drives the LCD 81 so that the LCD 81 displays thereon the same image twice for one frame period T without performing the overdrive processing for the image data concerned. The third mode is one which is desirable when the user hardly looks at the image displayed on the LCD 81 because the overdrive is too effective in the first mode.

Effects of First Embodiment

According to the above-mentioned first embodiment of the invention, the first mode is selected and the bright image is displayed in the case of the still image or the image having a small motion, and the second mode is selected in the case of the image, having a violent motion, obtained from a sports program or the like. As a result, it is possible to display the image having the improved moving image blur. In addition, the mode corresponding to the kind of image can be selected and carried out with the simple configuration in which one frame memory is merely used.

In addition, the data on the delay time $t_d$ and the data on the overdrive voltage $V_{od2}$ which are stored in the delay data memory 7 in advance can be adjusted and rewritten in accordance with the dispersion in property of the LCD panel 8. In particular, the delay time $t_d$ is easy to control. As a result, the yield of the liquid crystal display device 1 is enhanced.

Second Embodiment

In the liquid crystal display device according to the above-mentioned first embodiment of the invention, the description has been given with respect to the case where the same image data is read out twice from the frame memory 3 for one frame period. On the other hand, a liquid crystal display device according to a second embodiment of the invention is such that the read circuit 2B reads out the same image data three times from the frame memory 3 for one frame period and the MUTE circuit 4 outputs the first image data of the three pieces of the same image data which are obtained by reading the same image data three times for one frame period.

Figure 5A:
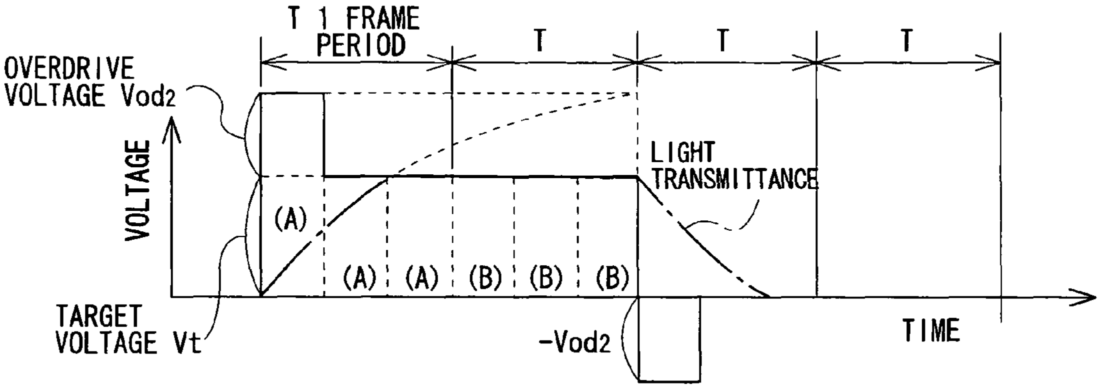
FIG. 5A is an exemplary graphical representation showing a waveform of a voltage applied to one pixel constituting the LCD of the liquid crystal display device according to a second embodiment of the invention, and a light transmittance of the liquid crystal in the LCD in a first mode.
Figure 5B:
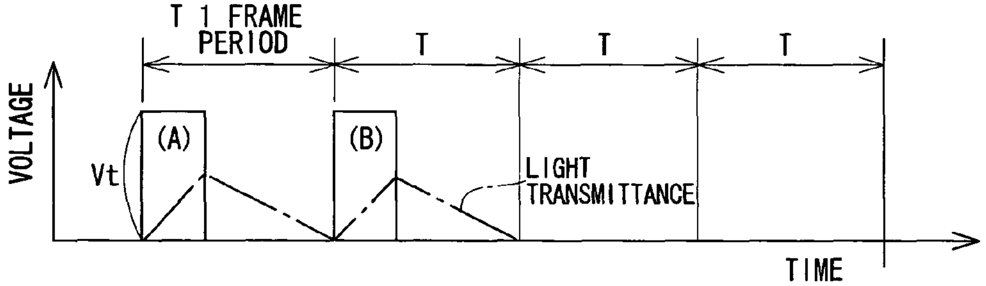
FIG. 5B is an exemplary graphical representation showing a waveform of a voltage applied to one pixel constituting the LCD of the liquid crystal display device according to the second embodiment of the invention, and the light transmittance of the liquid crystal in the LCD in a second mode.

FIG. 5A is a graphical representation showing a waveform of a voltage applied to one pixel constituting the LCD 81 of the liquid crystal display device 1 according to the second embodiment of the invention, and a light transmittance of the liquid crystal in the LCD 81 of the liquid crystal display device according to the second embodiment of the invention in a first mode. Also, FIG. 5B is a graphical representation showing a waveform of a voltage applied to one pixel constituting the LCD 81 of the liquid crystal display device 1 according to the second embodiment of the invention, and a light transmittance of the liquid crystal in the LCD 81 of the liquid crystal display device 1 according to the second embodiment of the invention in a second mode. In each of these figures, a solid line indicates the voltage waveform, and a dashed line indicates a light transmittance of the liquid crystal. In addition, reference symbols (A) and (B) designates respective pieces of the image data.

According to the second embodiment of the invention, since the image is displayed for a time period which is one-third one frame period in the second mode, the display form can be made closer to that in "the impulse type" in the second embodiment than in the first embodiment, and thus the moving image blur can be further improved.

It should be noted that the invention is not intended to be limited to the first and second embodiments, and thus the various changes and modifications thereof can be implemented. Although in each of the first and second embodiments, one frame period has been described as the predetermined period, the predetermined period is not limited to one frame period. For example, when one field period has three fields corresponding to R, G and B, respectively, a time period corresponding to one field may be set as the predetermined period.

In addition, in the first embodiment described above, the MUTE circuit 4 is structured so as to inhibit the image data from being outputted in the second half of one frame period in the second mode. Alternatively, the MUTE circuit 4 may be structured so as to output the image data in the second half of one frame period and inhibit the image data from being outputted in the first half of one frame period.

Moreover, in the first and second embodiments, the descriptions have been given with respect to the cases where the same image data is read out twice and three times from the frame-memory for the predetermined period, respectively. However, the number of times of reading out the same image data is not limited thereto, and thus may also be four or more.

In addition, in the first and second embodiments, the descriptions have been given with respect to the cases where the MUTE circuit 4 outputs only the first image data of the two pieces and three pieces of the same image data which are obtained by reading out the same image data twice and three times from the read circuit 2B, respectively. Alternatively, the image data may also be outputted over the number of times of output (twice or more) smaller than the number, n, of times of read. For example, when the same image data is read out four times from the read circuit 2B for one frame period, the MUTE circuit 4 may output the first and third image data of the four pieces of the same image data.

It should be noted that the present invention is not limited to the embodiments described above, and the various combinations and changes may be made without departing from or changing the technical idea of the present invention.

What is claimed is:

1. An image data-outputting unit, comprising:

a storage portion for storing therein image data supplied in a predetermined period; and an image data-outputting portion for outputting the image data (n−k) times (n and k; integral numbers (n>k≧0)) from the storage portion with an output period which is 1/n of the predetermined period;

wherein the image data-outputting portion comprises:

a reading portion for reading out the image data n times from the storage portion with an output period which is 1/n of the predetermined period; and a mute circuit for outputting the image data, which is read out n times, (n−k) times for the predetermined period.

2. An image data-outputting unit according to claim 1, wherein the mute circuit outputs the image data (n−k) times in a form of the same output pattern every predetermined period.

3. An image data-outputting circuit, comprising:

a storage portion for storing therein image data supplied in a predetermined period;

an image data-outputting portion for performing a first mode in which the image data is outputted n times from the storage portion in an output period which is 1/n of the predetermined period, or a second mode in which the image data is outputted (n−k) times (n and k: integral numbers (n>k≧0)) from the storage portion in an output period which is 1/n of the predetermined period;

an overdrive circuit for, when the first mode is performed, increasing or decreasing a data value of the current image data in accordance with the last image data for a precedent predetermined period and the current image data outputted from the image data-outputting portion, and outputting image data of the increased or decreased data value; and a selecting portion for selecting one of the first and second mode to provide a first or second mode signal to the image data-outputting portion and the over drive circuit.

4. An image data-outputting unit according to claim 3, wherein the image data-outputting portion comprises:

a reading portion for reading out the image data n times from the storage portion in a output period which is 1/n of the predetermined period; and a mute circuit for outputting the image data, which is read out n times, (n−k) times for the predetermined period.

5. An image data-outputting unit according to claim 4, wherein the mute circuit outputs the image data (n−k) times in a form of the same output pattern every predetermined period.

6. An image data-outputting unit according to claim 3, wherein the selecting portion is adapted to select a mode in which the overdrive circuit in the first mode is stopped as a third mode.

7. An image data-outputting unit according to claim 3, wherein the overdrive circuit executes overdrive processing in which a difference between the current image data and image data obtained by delaying the current image data by a predetermined time is obtained, and the difference thus obtained is increased or decreased and is outputted.

8. An image data-outputting unit according to claim 7, wherein the overdrive circuit previously stores a plurality of combinations between the predetermined time for delay, and an amount of increase or decrease of the difference.

9. An image data-outputting unit according to claim 7, wherein the overdrive circuit executes the overdrive processing so that a product of the predetermined time for delay and an amount of increase or decrease of the difference becomes the same value every predetermined period.

10. A liquid crystal display device, comprising:

a storage portion for storing therein image data supplied in a predetermined period;

an image data-outputting portion for performing a first mode in which the image data is outputted n times from the storage portion in an output period which is 1/n of the predetermined period, or a second mode in which the image data is outputted (n−k) times (n and k: integral number (n>k≧0)) from the storage portion in the period which is 1/n times as large as the predetermined period;

an overdrive circuit for, when the first mode is performed, increasing or decreasing a data value of the current image data in accordance with the last image data for a precedent predetermined period and the current image data outputted from the image data-outputting portion, and outputting image data of the increased or decreased data value;

a selecting portion for selecting one of the first and second modes to provide a first or second mode signal to the image data-outputting portion and the overdrive circuit; and a liquid crystal panel for displaying thereon an image corresponding to the image data outputted from the image data-outputting portion or the overdrive circuit in accordance with the first or second mode.

11. A liquid crystal display device according to claim 10, wherein the image data-outputting portion comprises:

a reading portion for reading out the image data n times from the storage portion in a period which is 1/n times of the predetermined period; and a mute circuit for outputting the image data, which is read out n times, (n−k) times for the predetermined period.

12. A liquid crystal display device according to claim 11, wherein the mute circuit outputs the image data (n−k) times in a form of the same output pattern every predetermined period.

13. A liquid crystal display device according to claim 11, wherein the selecting portion is adapted to select a mode in which the overdrive circuit in the first mode is stopped as a third mode.

14. A liquid crystal display device according to claim 11, wherein the overdrive circuit executes overdrive processing in which a difference between the current image data and image data obtained by delaying the current image data by a predetermined time is obtained, and the difference thus obtained is increased or decreased and is outputted.

15. A liquid crystal display device according to claim 14, wherein the overdrive circuit previously stores a plurality of combinations between the predetermined time for delay, and an amount of increase or decrease of the difference.

16. A liquid crystal display device according to claim 14, wherein the overdrive circuit executes the overdrive processing so that a product of the predetermined time for delay and an amount of increase or decrease of the difference becomes the same value every predetermined period.

* * * * *